United States Patent
H P

(10) Patent No.: US 12,192,401 B2
(45) Date of Patent: Jan. 7, 2025

(54) REAL TIME SWITCHING FROM UNSECURED TO SECURED SIGNALING CHANNEL

(71) Applicant: Avaya Management L.P., Durham, NC (US)

(72) Inventor: Ananda H P, Pune (IN)

(73) Assignee: Avaya Management L.P., Durham, NC (US)

( * ) Notice: Subject to any disclaimer, the term of this patent is extended or adjusted under 35 U.S.C. 154(b) by 267 days.

(21) Appl. No.: 17/689,714

(22) Filed: Mar. 8, 2022

(65) Prior Publication Data

US 2023/0291828 A1    Sep. 14, 2023

(51) Int. Cl.
| | | |
|---|---|---|
| *H04M 3/20* | (2006.01) | |
| *H04L 9/40* | (2022.01) | |
| *H04L 65/1104* | (2022.01) | |

(52) U.S. Cl.
CPC .......... *H04M 3/205* (2013.01); *H04L 63/166* (2013.01); *H04L 65/1104* (2022.05); *H04M 2203/609* (2013.01)

(58) Field of Classification Search
CPC ............ H04M 3/205; H04M 2203/609; H04L 63/166; H04L 65/1104; H04L 65/1073; H04L 65/1076; H04L 63/0428; H04L 65/1069; H04L 65/65; H04L 65/765; H04L 63/168
USPC ....................................................... 455/410
See application file for complete search history.

(56) References Cited

U.S. PATENT DOCUMENTS

| | | | |
|---|---|---|---|
| 8,942,671 B2 | 1/2015 | Haynes et al. | |
| 2010/0027793 A1* | 2/2010 | Maki ................. | H04L 65/1069 380/243 |
| 2014/0136718 A1* | 5/2014 | Menezes ............ | H04L 47/2441 709/227 |
| 2015/0188889 A1* | 7/2015 | Lawson ............. | H04W 4/18 726/15 |
| 2016/0285823 A1* | 9/2016 | Herrero ............. | H04L 63/0428 |

(Continued)

FOREIGN PATENT DOCUMENTS

| | | |
|---|---|---|
| CN | 101547269 | 9/2009 |
| CN | 104753889 | 7/2015 |

OTHER PUBLICATIONS

Andreasen et al. "Session Description Protocol (SDP) Capability Negotiation," IETF Trust, Sep. 2010, RFC 5939, 77 pages.

(Continued)

*Primary Examiner* — Don N Vo
(74) *Attorney, Agent, or Firm* — Sheridan Ross P.C.

(57) ABSTRACT

Calls that can be secure (e.g., are conducted with end-to-end encryption) may originate with some or all of the call being unsecured. Then, upon a triggering event such as a user deciding that sensitive information will be discussed or a "sniffer" determining that the call is being monitored by a spoofed endpoint, triggers a transition of the call from an unsecure connection to a secure connection without terminating and reestablishing the call. Accordingly, an unsecure call, such as one utilizing Transmission Control Protocol (TCP) signaling and Real-Time Transport Protocol (RTP) and transitioned to Transport Layer Security (TLS) and Secure RTP (SRTP) to allow a previously unsecured call to become secured with end-to-end encryption.

20 Claims, 4 Drawing Sheets

(56) References Cited

U.S. PATENT DOCUMENTS

2017/0171257 A1*  6/2017  Zhu ..................... H04L 65/403
2019/0302229 A1* 10/2019  Ling .................... G01S 13/003
2019/0372947 A1* 12/2019  Penar ................... G06N 3/08
2021/0194939 A1   6/2021  Forsyth et al.

OTHER PUBLICATIONS

Duke et al. "A Roadmap for Transmission Control Protocol (TCP) Specification Documents," IETF Trust, Feb. 2015, RFC 7414, 57 pages.
Rescorla et al. "The Transport Layer Security (TLS) Protocol Version 1.3," IETF Trust, Aug. 2018, RFC 8446, 160 pages.
Rosenberg et al. "SIP: Session Initiation Protocol," The Internet Society, Network Working Group, Jun. 2002, RFC 3261, 269 pages.
Official Action for United Kingdom Patent Application No. GB2303350.9, dated Sep. 12, 2023 7 pages.
Official Action for India Patent Application No. 202314012093, dated Jun. 25, 2024 6 pages.
Intention to Grant for United Kingdom Patent Application No. GB2303350.9, dated Jul. 18, 2024 2 pages.

* cited by examiner

REAL TIME SWITCHING FROM UNSECURED TO SECURED SIGNALING CHANNEL

FIELD OF THE DISCLOSURE

The invention relates generally to systems and methods for packetized communications and particularly to securing the packets during transmission.

BACKGROUND

Telephone communications are often conducted on unsecured lines that may allow for interception of the call by an electronic eavesdropper. If the parties of a call know that sensitive information is going to be discussed, the call may originate utilizing a secure line, such as one with point-to-point encryption. However, many calls originate with no intention of discussing sensitive material and, in the middle of a conversation, the parties may decide to talk about or share sensitive data. Since such call is unsecured, a hacker may intercept that sensitive data and exploit it.

In another example, a conversation is underway between a customer and an agent of a contact center. The call is unsecured (e.g., unencrypted) as the parties did not anticipate sharing any sensitive information. However, during the conversation, the agent may ask the customer to enter or speak sensitive information, such as credit/debit card numbers, date of birth etc. Since this call is unsecured, the customer's sensitive information may be seen or intercepted by a man-in-the-middle type of attack and exploited, such as for a malicious purpose/identity theft.

When utilizing Session Initiation Protocol (SIP) endpoints, if an endpoint is already registered on Transport Layer Security (TLS), then the end point can initiate a RE-INVITE. Such a feature is described in U.S. Pat. No. 8,942,671 to Haynes et al., filed on Feb. 27, 2012, and entitled "Methods, Systems, and Apparatus for Handling Secure-Voice Communication Sessions," which is incorporated herein by reference in its entirety for all that it teaches.

As identified above, one communication standard is SIP. SIP is a standard protocol that is well known in the field of telecommunications, and defined in Network Working Group RFC 3261 "SIP: Session Initiation Protocol" June 2002, (SIP) which is incorporated herein in its entirety by reference. In addition to SIP, other standards include: Network Working Group RFC 8446 "The Transport Layer Security (TLS) Protocol Version 1.3" August 2018; Network Working Group RFC 5939 "Session Description Protocol (SDP) Capability Negotiation" September 2010; and Network Working Group RFC 7414 "A Roadmap for Transmission Control Protocol (TCP) Specification Documents" February 2015; and including all references cited therein, ad infinitum, are incorporated herein by reference in their entireties for all that they teach.

Despite the advantages provided by the prior art, problems and opportunities to advance the state of the art remain.

SUMMARY

Parties often rely on legacy equipment and methods to establish non-secure (i.e., non-encrypted) calls for at least some communications. Securing a call is often not viewed as necessary, if considered at all, when the call is initiated as only mundane topics may be initially considered as the topics of discussion. However, once the call is underway, sensitive topics may come up for discussion either without considering the lack of security on the current call or deciding to proceed with the discussion in hopes that no one else (whether human or automated) is listening in. As a result, calls on non-secure lines often include discussions or other content comprising sensitive information and thereby puts that information at risk. When a call is initiated with end-to-end encryption, security is less of a concern. However, when a call is initiated without transmission security, on at least one leg of a call-path, there is an opportunity to initiate security "on the fly" without disconnecting and re-establishing the call, which presents an opportunity to improve communication security that would otherwise require calls to always be initiated with end-to-end security.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are provided to facilitate the escalation of an unsecured call to a secured call. Once complete, the user can share sensitive information with more confidence. If security is not required, the call can proceed unsecured without having to make a determination in advance of the call.

Prior art devices now allow communication devices, including but not limited to telephones, to display a security status of the call. However, with benefit of the embodiments provided herein, users will be given an option to escalate an unsecured call to secured, such as by a button or feature access code. When a user believes a call should be made secure, he/she may press the button or dial feature access code. A call server will then make the call secure with any of the available encryption schemes. Once the entire call is secured end-to-end, the call server will inform the users via their communication device. Sensitive data can be shared with more confidence.

In one embodiment, an endpoint is registered using a Transmission Control Protocol (TCP) link, however, sending to secure the call by sending a RE-INVITE would defeat the purpose of security because a hacker can sniff into the signaling and observe the keys directly. Accordingly, and in order to truly make a call secure, the signaling is upgraded to a secure mode, namely TLS. To do so, the endpoint re-registers itself over TLS, and then the endpoint will send an INVITE with a "Replaces" header and "Capacity Negotiation/Simplified Data Encryption Standard Session Description Protocol" (CAPNEG/SDES SDP) to replace the existing unsecured call with the secured one. If a call is deemed secured end-to-end, the call server will inform the requesting party's endpoint via an UPDATE message. After this UPDATE, an indication can be shown on user's endpoint screen that such call is now secure. User can then share the sensitive data with more confidence.

In another embodiment, a "sniffer" is provided to the telephony network to sense any external entity spoofing-into the call. If a sniffer detects any spoofing, it will then take action, which may include proactively triggering escalation of the unsecure call to a secured call. The sniffer can send an out-of-dialog PUBLISH messages to the endpoint(s) without requiring a change to the rest of the call-flow.

It should be appreciated that the embodiments herein are described with respect to voice calls. In other embodiments, additional or alternative forms of communication (e.g., text, video, file transfer, email, etc.) may be utilized without departing from the scope of the embodiments disclosed.

Exemplary aspects are directed to:

A method for securing an ongoing unsecured call is disclosed, comprising: establishing a call via a network between a first endpoint and second endpoint, the call comprising a signaling channel and a first data channel, wherein the signaling path comprises at least a portion not secured by end-to-end encryption; receiving a signal at the first endpoint to secure the call; in response to the signal, sending a first Session Initiation Protocol (SIP) message to the second endpoint; receiving, in response to the first SIP message, a second SIP message accepting the first message; and in response to the second SIP message, transitioning the call from the first data channel to the second data channel wherein the second data channel utilizes end-to-end encryption between the first end point and the second endpoint.

A system for securing an ongoing unsecured call is disclosed, comprising: a first endpoint comprising a processor and a first network interface to a network; a second endpoint comprising a processor and a second network interface to the network and wherein the first and second endpoints are engaged in a call via the network and wherein the call is initially established without end-to-end encryption; wherein one of the first endpoint or second endpoint receives a signal to secure the call; wherein, in response to the signal, sending a first Session Initiation Protocol (SIP) message to the second endpoint; receiving, in response to the first SIP message, a second SIP message accepting the first message; and in response to the second SIP message, transitioning the call from the first data channel to the second data channel wherein the second data channel utilizes end-to-end encryption between the first end point and the second endpoint.

A communications endpoint is disclosed, comprising: a processor comprising instructions maintained in a non-transitory memory; a network interface to a network for communicating thereon; and wherein the processor: receives a signal to secure a call wherein comprises the exchange of data packets with a second endpoint and wherein the call is absent end-to-end encryption; sends, in response to the signal, a first Session Initiation Protocol (SIP) message to the second endpoint; receives, in response to the first SIP message, a second SIP message accepting the first message; and in response to the second SIP message, transitions the call from the first data channel to the second data channel wherein the second data channel utilizes end-to-end encryption between the first end point and the second endpoint.

Any of the above aspects:

Wherein the first SIP message is sent from the first endpoint to the second SIP endpoint via sending the first SIP message to a server located in the signaling path which, in turn, provides the first SIP message to the Second SIP endpoint.

Wherein the first data channel comprises of a Real-Time Transport Protocol (RTP).

Wherein the second data channel consists entirely of a Secure Real-Time transport Protocol (SRTP).

Wherein the signaling channel utilized to establish the first data channel comprises a Transmission Control Protocol (TCP).

Wherein the signaling channel utilized after the second SIP message consists entirely of a Transport Layer Security (TLS) connection.

Wherein the signal is provided in response a user selection received on the first endpoint.

Further comprising: a sniffer application operable to determine that a spoofed endpoint is a node of the call; and wherein the sniffer provides the signal to the first endpoint upon determining that a spoofed endpoint is currently present on the call.

Further comprising: a sniffer comprising a third network interface to the network; and wherein the sniffer, upon detecting the presence of a spoofed endpoint on the call, provides the signal to the one of the first or second endpoint.

Wherein the first SIP message is sent from the first endpoint to the second SIP endpoint via sending the first SIP message to a server located in the signaling path which, in turn, provides the first SIP message to the Second SIP endpoint.

Wherein the first data channel comprises of a Real-Time Transport Protocol (RTP).

Wherein the second data channel consists entirely of a Secure Real-Time Transport Protocol (SRTP).

Wherein the signaling channel utilized to establish the first data channel comprises a Transmission Control Protocol (TCP).

Wherein the signaling channel utilized after the second SIP message consists entirely of a Transport Layer Security (TLS) connection.

Further comprising a user input component on the at least one of the first endpoint or the second endpoint and wherein the signal is provided in response a user selection received by the user input.

Wherein the signal is received from the second endpoint.

Wherein the signal is received from a sniffer monitoring the call and in response to the sniffer determining that a spoofed endpoint is on the call.

Further comprising: a user input component; and wherein the signal is received by the user input component in response to receiving an input to the user input component.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
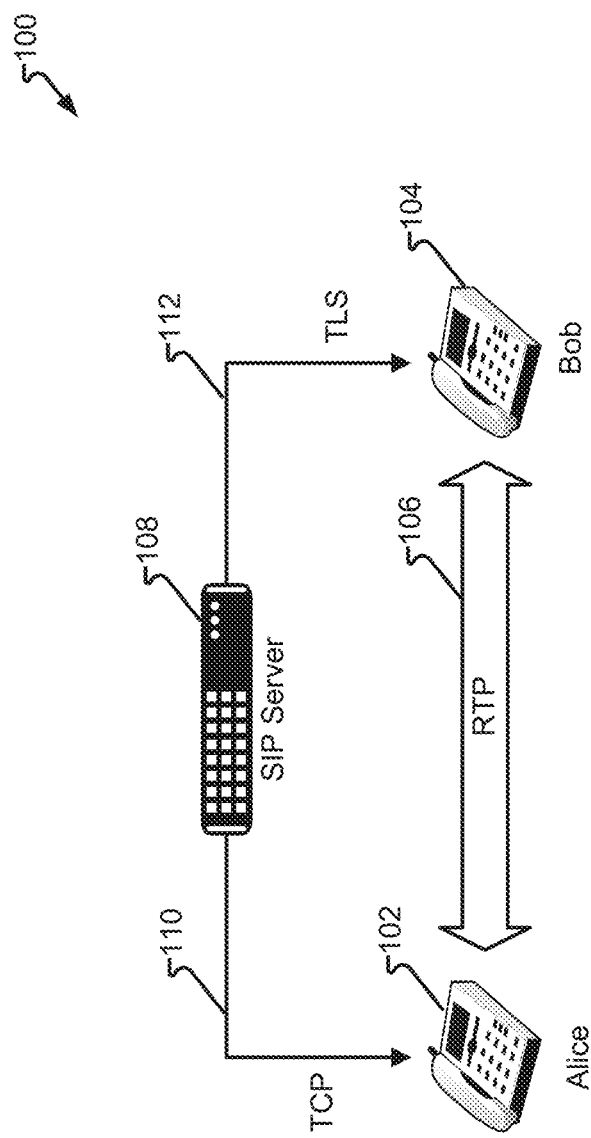
FIG. 1 depicts a system in accordance with embodiments of the present disclosure.

FIG. 1 depicts system 100 in accordance with embodiments of the present disclosure. In one embodiment, first endpoint 102 and second endpoint 104 are initially engaged in a non-secure call with each other. First endpoint 102 is registered with server 108 via TCP signaling path 110 and second endpoint 104 is registered with server 108 via TLS signaling path 112. As some or all of the signaling path (i.e., TCP signaling path 110 and TLS signaling path 112) is unsecure, the call is considered unsecure. While each of first endpoint 102 and second endpoint 104 are illustrated as digital telephones, it should be appreciated that other form-factors may be utilized without departing from the scope of the embodiments disclosed, such as a personal computer, laptop, etc. with a Voice-over-IP (VoIP) client. In another embodiment, other communication devices, such a mobile phones comprising processors and network connections while utilizing data connectivity to the Internet, may similarly utilize a VoIP client and benefit from the embodiments provided herein to secure a previously unsecure call.

As is known in SIP, data packets, such as those comprising packetized voice communications, are exchanged on a separate real-time data channel, namely RTP data channel 106. Optionally, while the call is underway, one or both of first endpoint 102 or second endpoint 104 may present a light, message, or other indicia that the call is unsecure, such as to notify users thereof of the current unsecure state in the hopes that the users will not discuss sensitive information.

Figure 2:
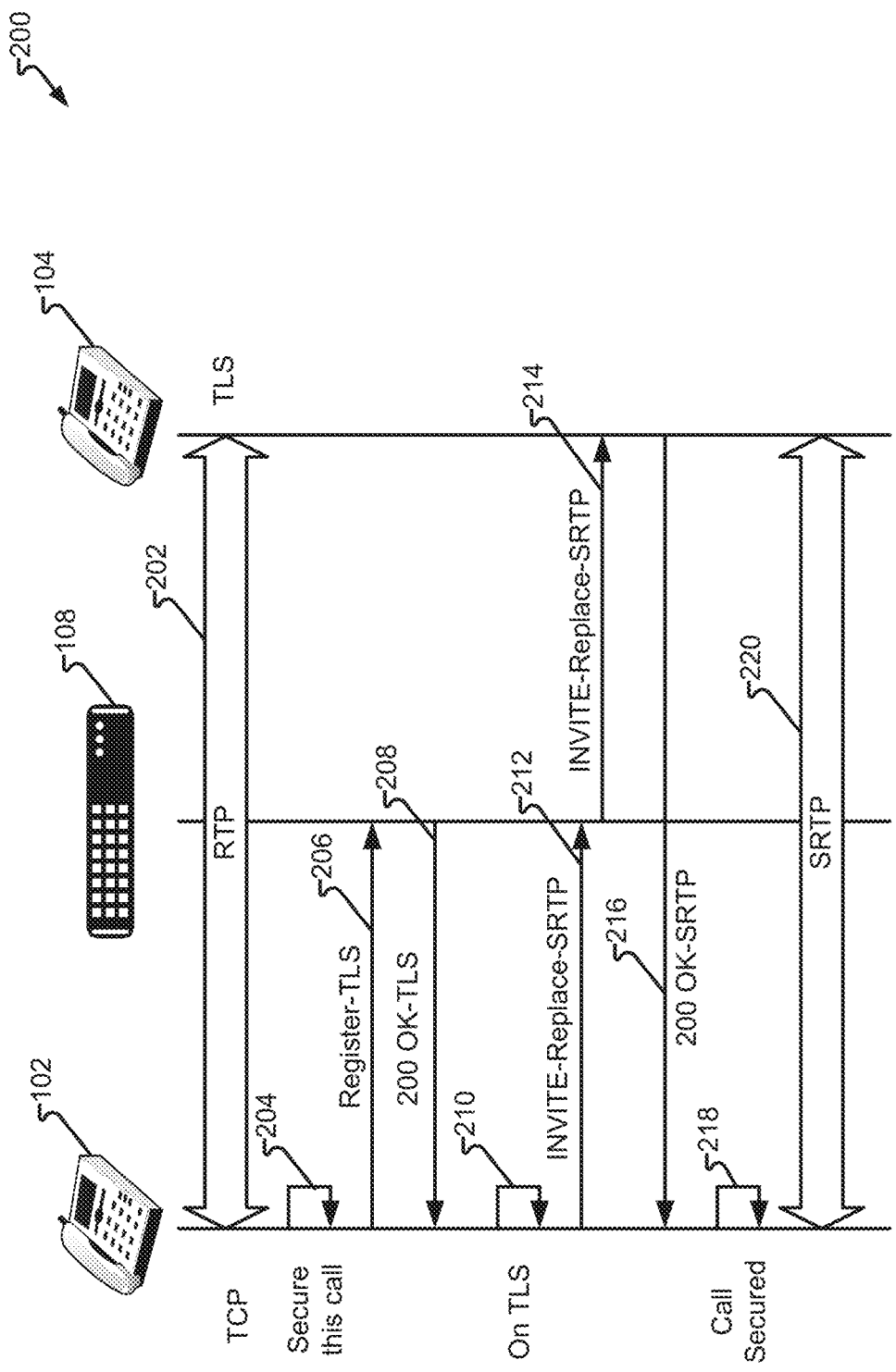
FIG. 2 depicts an interaction in accordance with embodiments of the present disclosure.

FIG. 2 depicts interaction 200 in accordance with embodiments of the present disclosure. Interaction 200 illustrates operations of first endpoint 102, server 108, and second endpoint 104, each of which comprise a network interface and at least one processor with instructions maintained in a non-transitory memory to cause the at least one processor to perform operations of interaction 200.

Interaction 200 begins with first endpoint 102 and second endpoint 104 exchanging data packets via a data channel, namely RTP 202. First endpoint 102 is registered with server 108, as a portion of the signaling path, utilizing TCP (unsecure), while second endpoint 104 is registered utilizing TLS. As at least a portion of the signaling path is unsecure, the call is unsecured and vulnerable to eavesdropping. A user of first endpoint 102 initiates security in step 204. As a result, step 206 sends a register TLS message to server 108 and, in response, receives reply message 208 of "200 OK" for the TLS message. At step 210, first endpoint 102 is now registered on TLS. In another embodiment, step 206 sends the registration message directly to second endpoint 104, and without sending the register TLS message to server 108, in reply message 208 is then returned from second endpoint 104 to first endpoint 102, which similarly omits server 108.

Next, step 212 sends "INVITE-Replace-SRTP" message to server 108 which processes and forwards the message to second endpoint 104 in step 214 to initiate transition to a Secure Real-Time Transport Protocol (SRTP) connection, which may be embodied as a SIP "INVITE" message having header information, whether new or leveraging current header values, indicating "Replace-SRTP." In embodiments wherein server 108 is omitted, such as when step 206 and 208 exchange messages directly between first endpoint 102 and second endpoint 104 and omit server 108, step 212 and step 214 are combined, such that one "INVITE-Replace-SRTP" message is sent from first endpoint 102 directly to second endpoint 104 and omitting server 108. Second endpoint 104 replies to first endpoint 102 with "200 OK-SRTP" in step 216. At this point the call is now secure in step 218 and first endpoint 102, and optionally second endpoint 104, may present indicia of the call being secure. The data channel is now underway utilizing a secure real-time transport protocol, namely SRTP data channel 220 comprising point-to-point encryption between first endpoint 102 and second endpoint 104.

Figure 3:
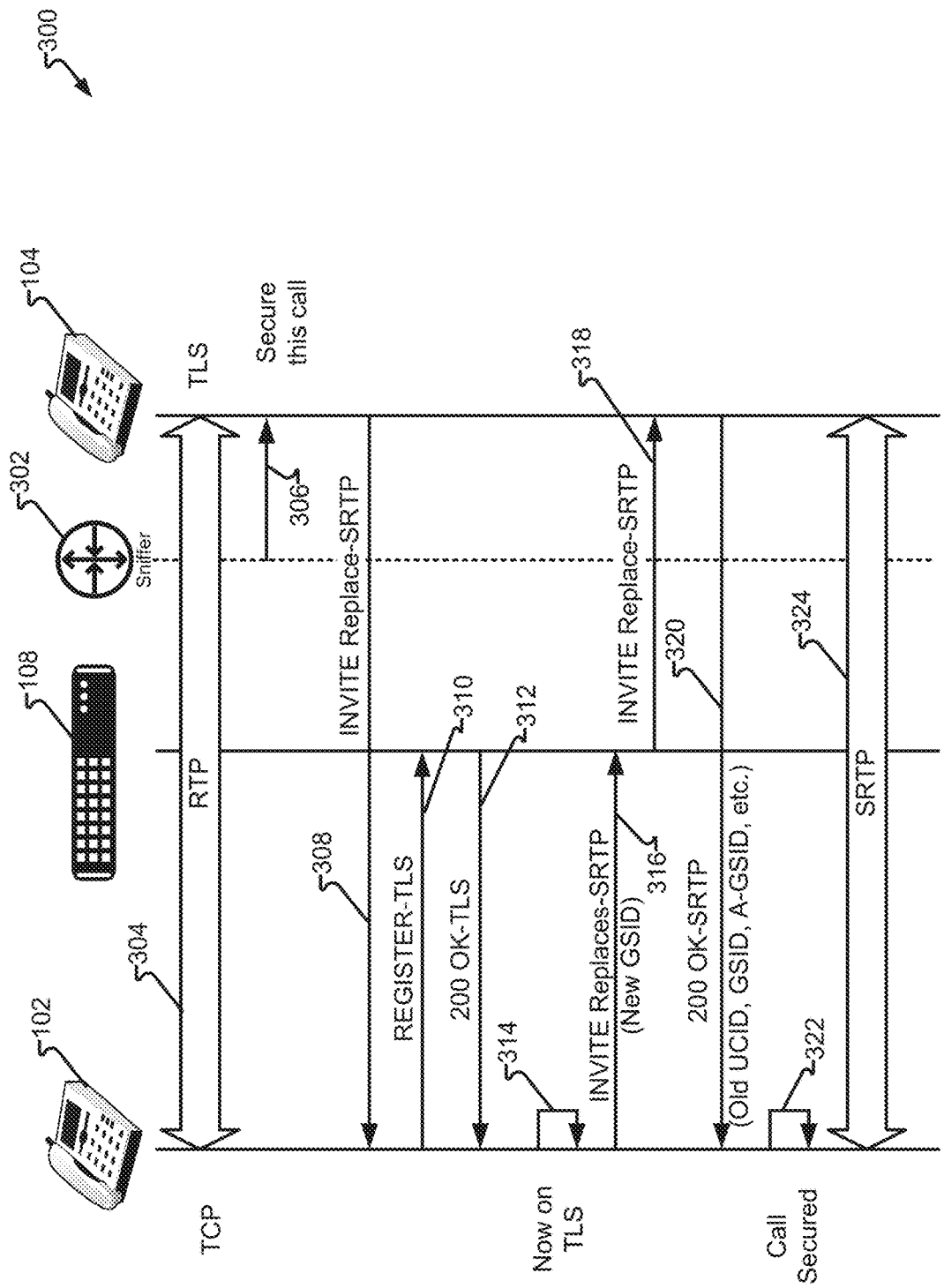
FIG. 3 depicts an interaction in accordance with embodiments of the present disclosure.

FIG. 3 depicts interaction 300 in accordance with embodiments of the present disclosure. Interaction 300 illustrates operations of first endpoint 102, server 108, and second endpoint 104, each of which comprise a network interface and at least one processor with instructions maintained in a non-transitory memory to cause the at least one processor to perform operations of interaction 300.

Interaction 300 begins with first endpoint 102 and second endpoint 104 exchanging data packets via a data channel, namely RTP 304. Sniffer 302 monitors the network, comprising at least a portion of the connections supporting RTP 304 and determines that a spoofed endpoint is present on the communication and the call is likely being monitored by an unauthorized entity. In response, sniffer 302 sends a signal to second endpoint 104 to secure the call in step 306.

In response, second endpoint 104 sends "INVITE Replace-SRTP" to first endpoint 102 in step 308 to initiate transfer to a secure channel. In step 310, which may be embodied as a SIP "INVITE" message having header information to indicate TLS registration, which may further leverage existing SIP message formats or include a new header, such as to indicate "Replace-SRTP." First endpoint 102 then sends "REGISTER-TLS" to server 108 in step 310 and receives in response message "200 OK-TLS" in step 312. First endpoint 102 is now on TLS in step 314.

In another embodiment, such as a peer-to-peer connection that omits server 108, steps 310, 312, and 316/318 may omit server 108 and exchange messages directly between first endpoint 102 and second endpoint 104 and omitting server 108.

In response to being on TLS, first endpoint 102 sends message "INVITE Replaces-SRTP" in step 316/318 with headers that comprise an identifier sufficient to identify the call flow, which may comprise, at least in part, identifiers to maintain the call on non-SIP portions. Accordingly, one or more identifiers, such as Global Session Identifier (GSID), Universal Call Identifier (UCID), Associated-Global Session Identifier ("A-GSID") are utilized in order to allow second endpoint 104, server 108 and/or any other component to identify the call flow. Server 108 processes and forwards the message to second endpoint 104 in step 318 causing second endpoint 104 to respond to first endpoint 102 with "200 OK-SRTP" message, comprising the old UCID, GSID and/or A-GSID to identify the call flow in step 320. Then, at step 322 the call is secure and the data channel between first endpoint 102 and second endpoint 104 utilizes SRTP channel 324 and discontinues RTP 304.

Figure 4:
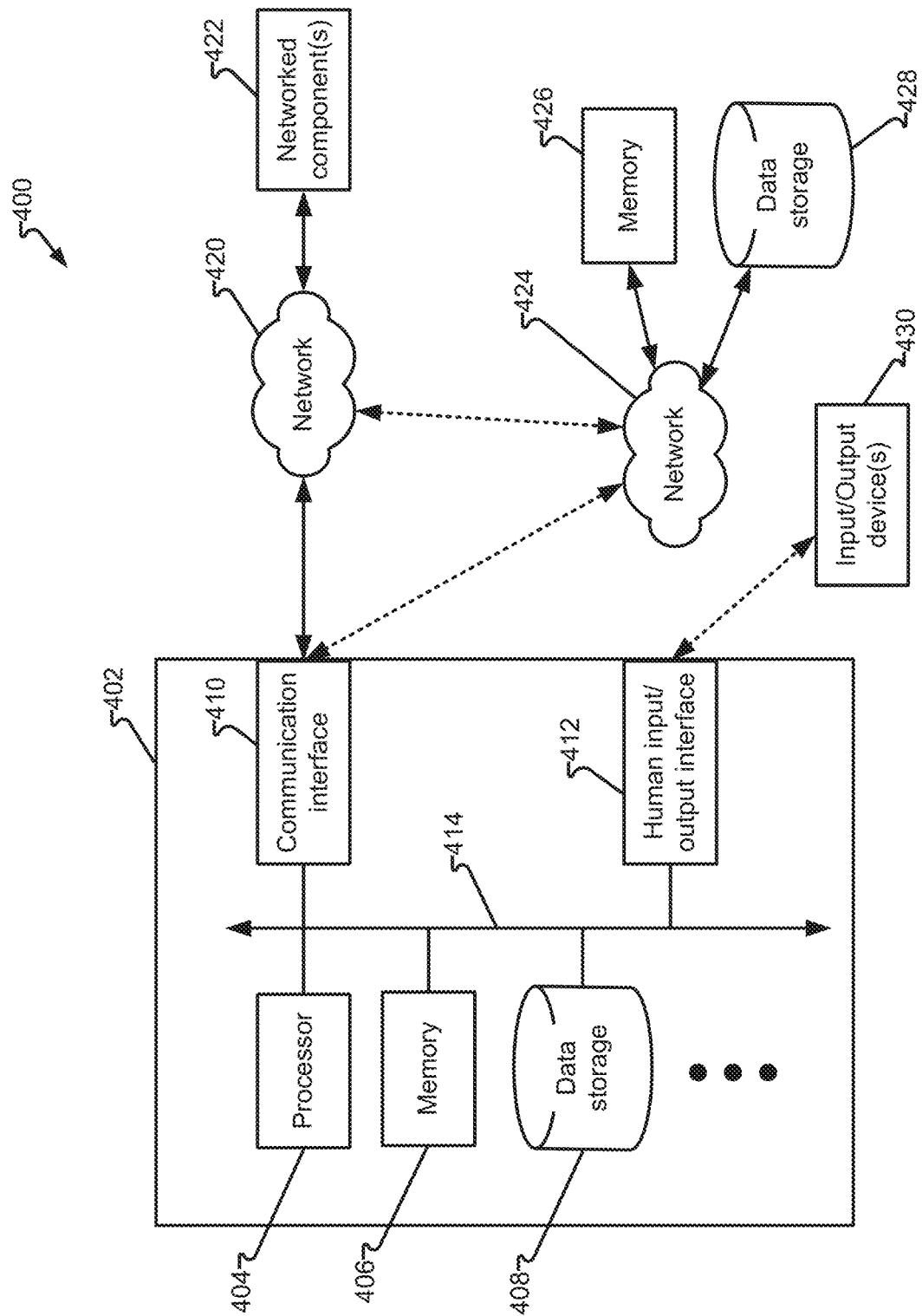
FIG. 4 depicts a system in accordance with embodiments of the present disclosure.

FIG. 4 depicts system 400 in accordance with embodiments of the present disclosure. In one embodiment, first endpoint 102, second endpoint 104, and server 108 may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may be further embodied as a single electronic microprocessor or multi-processor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to enable VAX-specific applications to execute on a virtual VAX processor), however, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or utilize one or more networks, such as network 420 and/or network 424.

A network interconnecting first endpoint 102, second endpoint 104, and server 108 may be embodied, in whole or in part, as network 420. Network 420 may be a wired network (e.g., Ethernet), wireless (e.g., WiFi, Bluetooth, cellular, etc.) network, or combination thereof and enable device 402 to communicate with networked component(s) 422. In other embodiments, network 420 may be embodied, in whole or in part, as a telephony network (e.g., public switched telephone network (PSTN), private branch exchange (PBX), cellular telephony network, etc.)

Additionally or alternatively, one or more other networks may be utilized. For example, network 424 may represent a second network, which may facilitate communication with components utilized by device 402. For example, network 424 may be an internal network of a business entity or other organization whereby components are trusted (or at least more so) as networked components 422, which may be connected to network 420 comprising a public network (e.g., Internet) that may not be as trusted.

Components attached to network 424 may include memory 426, data storage 428, input/output device(s) 430, and/or other components that may be accessible to processor 404. For example, memory 426 and/or data storage 428 may supplement or supplant memory 406 and/or data storage 408 entirely or for a particular task or purpose. As another example, memory 426 and/or data storage 428 may be an external data repository (e.g., server farm, array, "cloud," etc.) and enable device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of memory 406, data storage 408, memory 426, data storage 428 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 430 may be a router, switch, port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for securing an ongoing unsecured call, comprising:
   establishing a call via a network between a first endpoint and second endpoint, the call comprising a signaling path and a first data channel, wherein the signaling path comprises at least a portion not secured by end-to-end encryption;
   receiving a signal at the first endpoint to secure the call;
   in response to the signal, sending a first Session Initiation Protocol (SIP) message to the second endpoint;
   receiving, in response to the first SIP message, a second SIP message accepting the first SIP message; and
   in response to the second SIP message, transitioning the call from the first data channel to a second data channel, wherein the second data channel utilizes end-to-end encryption between the first endpoint and the second endpoint.

2. The method of claim 1, wherein the first SIP message is sent from the first endpoint to the second endpoint via sending the first SIP message to a server located in the signaling path which, in turn, provides the first SIP message to the second endpoint.

3. The method of claim 1, wherein the first data channel comprises a Real-Time Transport Protocol (RTP).

4. The method of claim 1, wherein the second data channel consists entirely of a Secure Real-time transport Protocol (SRTP).

5. The method of claim 1, wherein the signaling path utilized to establish the first data channel comprises a Transmission Control Protocol (TCP).

6. The method of claim 1, wherein the signaling path utilized after the second SIP message consists entirely of a Transport Layer Security (TLS) connection.

7. The method of claim 1, wherein the signal is provided in response to a user selection received on the first endpoint.

8. The method of claim 1, further comprising:
   a sniffer application operable to determine that a spoofed endpoint is a node of the call; and
   wherein the sniffer application provides the signal to the first endpoint upon determining that a spoofed endpoint is currently present on the call.

9. A system for securing an ongoing unsecured call, comprising:
   a first endpoint comprising a processor and a first network interface to a network;
   a second endpoint comprising a processor and a second network interface to the network, wherein the first endpoint and the second endpoint are engaged in a call, via the network, the call comprising a signaling path and a first data channel, wherein the signaling path comprises at least a portion not secured by end-to-end encryption, and wherein the call is initially established without end-to-end encryption;
   wherein one of the first endpoint or the second endpoint receives a signal to secure the call;
   wherein, in response to the signal, sending, by the one of the first endpoint or the second endpoint that received the signal, a first Session Initiation Protocol (SIP) message to one other of the first endpoint or the second endpoint;
   receiving, in response to the first SIP message, a second SIP message accepting the first SIP message; and
   in response to the second SIP message, transitioning the call from the first data channel to a second data channel, wherein the second data channel utilizes end-to-end encryption between the first endpoint and the second endpoint.

10. The system of claim 9, further comprising:
    a sniffer comprising a third network interface to the network; and
    wherein the sniffer, upon detecting the presence of a spoofed endpoint on the call, provides the signal to the one of the first endpoint or the second endpoint.

11. The system of claim 9, wherein the first SIP message is sent from the first endpoint to the second endpoint via sending the first SIP message to a server located in the signaling path which, in turn, provides the first SIP message to the second endpoint.

12. The system of claim 9, wherein the first data channel comprises of a Real-Time Transport Protocol (RTP).

13. The system of claim 9, wherein the second data channel consists entirely of a Secure Real-time Transport Protocol (SRTP).

14. The system of claim 9, wherein the signaling path utilized to establish the first data channel comprises a Transmission Control Protocol (TCP).

15. The system of claim 9, wherein the signaling path utilized after the second SIP message consists entirely of a Transport Layer Security (TLS) connection.

16. The system of claim 9, further comprising a user input component on the one of the first endpoint or the second endpoint and wherein the signal is provided in response a user selection received by the user input component.

17. A communications endpoint, comprising:
    a processor comprising instructions maintained in a non-transitory memory;
    a network interface to a network for communicating thereon; and
    wherein the processor:
      receives a signal to secure a call, via the network, the call comprising a signaling path and a first data channel, wherein the signaling path comprises at least a portion not secured by end-to-end encryption, wherein the call comprises an exchange of data packets with a second endpoint, and wherein the call is absent end-to-end encryption;
      sends, in response to the signal, a first Session Initiation Protocol (SIP) message to the second endpoint;
      receives, in response to the first SIP message, a second SIP message accepting the first SIP message; and
      in response to the second SIP message, transitions the call from the first data channel to a second data channel, wherein the second data channel utilizes end-to-end encryption between a first endpoint and the second endpoint.

18. The communications endpoint of claim 17, wherein the signal is received from the second endpoint.

19. The communications endpoint of claim 17, wherein the signal is received from a sniffer monitoring the call and in response to the sniffer determining that a spoofed endpoint is on the call.

20. The communications endpoint of claim 17, further comprising:
- a user input component; and
- wherein the signal is received by the user input component in response to receiving an input to the user input component.

\* \* \* \* \*